UNITED STATES PATENT OFFICE 2,653,949

1-(DI-n-BUTYLAMINOALKYLAMINO)-4-METHYLTHIAXANTHONES AND SYNTHESIS THEREOF

Sydney Archer, Albany, N. Y., assignor to Sterling Drug Inc., New York, N. Y., a corporation of Delaware No Drawing. Application November 22, 1950, Serial No. 197,171

2 Claims. (Cl. 260—328)

This invention relates to 1-(di-n-butylaminoalkylamino)-4-methylthiaxanthones and to their method of preparation. In particular it relates to such thiaxanthones having the structural formula

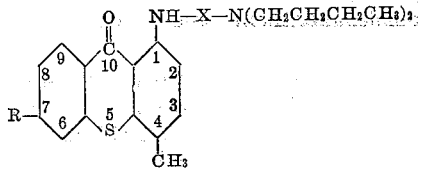

where R is hydrogen, a halo group, a lower alkyl radical or a lower alkoxy radical and X is a lower alkylene radical having its two connecting linkages on adjacent carbon atoms. These compounds of my invention are useful as chemotherapeutic agents, for instance, as agents in treating schistosomiasis.

In the above formula R, when halo, means chloro, bromo, iodo and fluoro. R, when lower alkyl or lower alkoxy, has preferably 1-4 carbon atoms inclusive, including such radicals as methyl, ethyl, n-propyl, isopropyl, n-butyl, isobutyl and 2-butyl for lower alkyl; and methoxy, ethoxy, n-propoxy, isopropoxy, n-butoxy, isobutoxy and 2-butoxy for lower alkoxy. The lower alkylene radical, designated hereinabove as X, has preferably from 2-4 carbon atoms, inclusive. X thus comprehends such radicals as —CH$_2$CH$_2$—, —CH(CH$_3$)CH$_2$—,
—CH$_2$CH(CH$_3$)—,
—CH(CH$_3$)CH(CH$_3$)—, —CH(C$_2$H$_5$)CH$_2$—, and the like.

My compounds are prepared by heating, preferably in refluxing pyridine at atmospheric pressure, a di-n-butylaminoalkylamine having the formula, (CH$_3$CH$_2$CH$_2$CH$_2$)$_2$N—X—NH$_2$, with a 1-halo-4-methylthiaxanthone having the formula

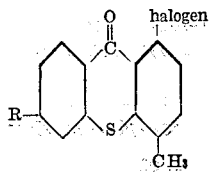

where halogen means chloro, bromo, iodo and fluoro, and where X and R have the meanings designated hereinabove. The intermediate 1-halo-4-methyl-7-R-thiaxanthones where R is a halo group, a lower alkyl radical or a lower alkoxy radical are prepared by cyclizing a 2-(2-methyl-5-halo-phenylmercapto)-4-R-benzoic acid. These intermediate 2-(2-methyl-5-halo-phenylmercapto)-4-R-benzoic acids, which are prepared by heating a metal salt of a 2-halo-4-substituted-benzoic acid with a metal salt of a 2-methyl-5-halothiophenol in the presence of a copper catalyst, are described and claimed in my copending application Serial Number 197,174, filed November 22, 1950, now abandoned.

The intermediate 1-chloro-4-methylthiaxanthone (where R is H) was obtained mixed with its 1-chloro-4-methyl isomer according to Ullmann and Glenck [Ber. 49, 2487 (1916)] by condensing para-chlorotoluene with thiosalicyclic acid in sulfuric acid. I also prepared this mixture of isomeric chloro-methylthiaxanthones by substituting dithiosalicyclic acid for thiosalicyclic acid in the condensation with para-chlorotoluene, a specific adaptation of a general procedure first discovered by Davies and Smiles [J. Chem. Soc. 97, 1290 (1909)]. This mixture of isomeric thiaxanthones can be used satisfactorily in the condensation with a di-n-butylaminoalkylamine since only the 1-chloro-4-methyl isomer reacts with the diamine.

Illustrative of my invention are the preparations of 1-(2-di-n-butylaminoethylamino)-4-methyl-7-iodothiaxanthone, 1-(2-di-n-butylaminoethylamino)-4-methyl-7-ethylthiaxanthone and 1-(2-di-n-butylaminoethylamino)-4-methyl-7-isopropoxythiaxanthone in the form of their hydrohalide addition salts by reacting 2-di-n-butylaminoethylamine with 1-chloro-4-methyl-7-iodothiaxanthone, 1-bromo-4-methyl-7-ethylthiaxanthone and 1-iodo-4-methyl-7-isopropoxythiaxanthone, respectively. Reaction of 2-(di-n-butylamino)ethylamine with the above described mixture of 1-chloro-4-methylthiaxanthone and 1-methyl-4-chlorothiaxanthone results in the formation of 1-(2-di-n-butylaminoethylamino)-4-methylthiaxanthone in the form of its hydrochloride addition salt.

My 1-(2-di-n-butylaminoalkylamino)-4-methylthiaxanthones are therapeutically active when administered orally whether employed as the free bases or as their salts with relatively non-toxic organic or inorganic acids, although in most cases the salt form is more convenient to employ. I found it convenient to isolate my compounds as the hydrohalides, especially the hydrochlorides. However, other acid addition salts are within the scope of my invention, such salts including the phosphates, sulfates, citrates, ethanesulfonates, tartrates, succinates, acetates, benzoates, mandelates, oleates, and the like.

EXAMPLE 1

A. 1-chloro-4,7-dimethylthiaxanthone

A mixture of 10 g. of 2-(2-methyl-5-chlorophenylmercapto) - 4 - methylbenzoic acid and 100 g. of concentrated sulfuric acid was heated with stirring on a steam bath for ninety minutes. The reaction mixture was cooled, poured into water and the resulting aqueous mixture filtered. The yellow solid was suspended in dilute ammonia and heated to boiling. After ten minutes the solid was filtered, washed with water and then with acetone, and dried. There was thus obtained 8.5 g. of 1-chloro-4,7-dimethylthiaxanthone, M. P. 147.8–148.8° C. (cor.) when recrystallized from acetic acid-water.

Anal.—Calcd. for $C_{15}H_{11}ClOS$: C, 65.56; H, 4.04. Found: C, 65.47; H, 4.35.

Other 1-halo-4-methyl-7-alkylthiaxanthones can be obtained according to the foregoing procedure by using other 2-(2-methyl-5-halophenylmercapto)-4-alkylbenzoic acids in place of 2-(2-methyl - 5 - chlorophenylmercapto) - 4 - methylbenzoic acid. Thus, using 2-(2-methyl-5-bromophenylmercapto) - 4 - ethylbenzoic acid, 2 - (2-methyl - 5 - iodophenylmercapto) - 4 - isopropylbenzoic acid, 2-(2-methyl-5-chlorophenylmercapto)-4-n-butylbenzoic acid and 2-(2-methyl-5 - chlorophenylmercapto) - 4 - isobutylbenzoic acid, there is obtained, respectively, 1-bromo-4-methyl-7-ethylthiaxanthone, 1-iodo-4-methyl-7-isopropylthiaxanthone, 1-chloro-4-methyl-7-n-butylthiaxanthone and 1-chloro-4-methyl-7-isobutylthiaxanthone.

B. 1-(2-di-n-butylaminoethylamino) - 4,7 - dimethylthiaxanthone hydrochloride A mixture of 6.0 g. of 1-chloro-4,7-dimethylthiaxanthone, 5.0 g. of 2-di-n-butylaminoethylamine and 5.0 g. of pyridine was refluxed for eighteen hours at atmospheric pressure. The solution was cooled to 80° C., treated with about 25 ml. of absolute ethanol, and the resulting solution was boiled and then filtered. To the hot filtrate there was added an excess of 25% ethanolic hydrogen chloride. On cooling, the desired hydrochloride separated. It was filtered, washed with cold ethanol and dried. This product, 1-(2-di-n-butylaminoethylamino) - 4,7 - dimethylthiaxanthone hydrochloride, melted at 153.5–154.7° C. (cor.) when recrystallized from acetone, with charcoaling.

Anal.—Calcd. for $C_{25}H_{34}N_2OS \cdot HCl$: N, 6.27; S, 7.17. Found: N, 6.19; S, 7.46.

Other 1-(2-di-n-butylaminoethylamino) - 4-methyl-7-alkylthiaxanthones can be prepared following the directions given above, but using other 1-halo-4-methyl-7-alkylthiaxanthones in place of 1 - chloro - 4,7 - dimethylthiaxanthone. Thus, using 1-bromo-4-methyl-7-ethylthiaxanthone, 1-iodo-4-methyl-7-isopropylthiaxanthone, 1-chloro-4-methyl-7-n-butylthiaxanthone and 1-chloro-4-methyl-7-isobutylthiaxanthone, there is obtained 1-(2-di-n - butylaminoethylamino) - 4-methyl - 7 - ethylthiaxanthone hydrobromide, 1-(2-di-n-butylaminoethylamino) - 4 - methyl - 7-isopropylthiaxanthone hydroiodide, 1-(2-di-n-butylaminoethylamino)-4-methyl-7 - n - butylthiaxanthone hydrochloride and 1-(2-di-n-butylaminoethylamino) -4-methyl-7 - isobutylthiaxanthone hydrochloride, respectively.

EXAMPLE 2

A. 1,7-dichloro-4-methylthiaxanthone

This preparation was carried out according to the procedure described hereinabove for Example 1A, but using 4.0 g. of 2-(2-methyl-5-chlorophenylmercapto)-4-chlorobenzoic acid and 40 g. of sulfuric acid. There was thus obtained 3.5 g. of 1,7-dichloro -4 - methylthiaxanthone, M. P. 196–197° C. (cor.) when recrystallized from acetic acid.

Anal.—Calcd. for $C_{14}H_8Cl_2OS$: C, 57.1; H, 2.71. Found: C, 57.5; H, 2.94.

Other 1,7-dihalo-4-methylthiaxanthones can be prepared according to the above procedure by substituting the appropriate 2-(2-methyl-5-halophenylmercapto)-4-halobenzoic acid for 2-(2-methyl-5-chlorophenylmercapto) - 4 - chlorobenzoic acid. Thus, using 2-(2-methyl-5-bromophenylmercapto)-4-bromobenzoic acid, 2-(2-methyl-5-iodophenylmercapto) - 4 - iodobenzoic acid, 2 - (2-methyl-5-chlorophenylmercapto) - 4 - bromobenzoic acid and 2-(2-methyl-5-chlorophenylmercapto)-4-iodobenzoic acid, there is obtained 1,7-dibromo-4-methylthiaxanthone, 1,7-diiodo-4-methylthiaxanthone, 1-chloro-4-methyl-7-bromothiaxanthone and 1-chloro-4-methyl-7-iodothiaxanthone, respectively.

B. 1-(2-di-n-butylaminoethylamino)-4-methyl-7-chlorothiaxanthone hydrochloride A mixture of 3.5 g. of 1,7-dichloro-4-methylthiaxanthone, 3.0 g. of 2-di-n-butylaminoethylamine and 3 g. of pyridine was refluxed for eighteen hours. The solution was cooled, treated with a 50% aqueous potassium hydroxide solution, and the resulting alkaline solution steam-distilled. The residue was cooled and taken up in chloroform. The chloroform solution was dried and the chloroform was removed by distillation under reduced pressure. The oil that remained was dissolved in dry ether, the ether solution filtered and the filtrate treated with ethanolic hydrogen chloride, whereupon there separated the product, 1-(2-di-n-butylaminoethylamino)-4-methyl-7-chlorothiaxanthone hydrochloride, which melted at 164.4–165.6° C. (cor.) when recrystallized from ethanol-ether.

Anal.—Calcd. for $C_{24}H_{31}ClN_2OS \cdot HCl$: N, 5.99. Found: N, 5.72.

Other 1-(2-di - n - butylaminoethylamino)-4-methyl-7-halothiaxanthones can be prepared according to the procedure given above, but using other 1,7-dihalo-4-methylthiaxanthones in place of 1,7 - dichloro - 4 - methylthiaxanthone. Thus, using 1,7-dibromo-4-methylthiaxanthone or 1-chloro-4-methyl-7-bromothiaxanthone, there is obtained 1 - (2 - di-n-butylaminoethylamino)-4-methyl-7-bromothiaxanthone in the form of its hydrobromide or hydrochloride addition salt, respectively. Using 1,7 - diiodo-4-methylthiaxanthone or 1-chloro-4-methyl-7-iodothiaxanthone, there is obtained 1-(2-di-n-butylaminoethylamino)-4-methyl-7-iodothiaxanthone in the form of its hydroiodide or hydrochloride addition salt, respectively.

EXAMPLE 3

A. 1-chloro-4-methyl-7-methoxythiaxanthone

The preparation of this compound was carried out following the procedure described hereinabove in Example 1A, but using 16.0 g. of 2-(2-methyl-5-chlorophenylmercapto)-4-methoxybenzoic acid and 160 g. of sulfuric acid, and a heating period of thirty minutes. There was obtained 9.7 g. of 1-chloro-4-methyl-7-methoxythiaxanthone, M. P.

188.0-190.1° C. (cor.) when recrystallized from acetic acid.

*Anal.*—Calcd. for $C_{15}H_{11}ClO_2S$: S, 11.03. Found: S, 11.08.

Other 1-halo-4-methyl-7-alkoxythiaxanthones can be prepared according to the above procedure, but substituting the appropriate 2-(2-methyl-5-halophenylmercapto)-4-alkoxybenzoic acid for 2-(2-methyl-5-chlorophenylmercapto)-4-methoxybenzoic acid. Thus, using 2-(2-methyl-5-bromophenylmercapto) - 4 - ethoxybenzoic acid, 2-(2-methyl-5-iodophenylmercapto) -4-n-propoxybenzoic acid, 2-(2-methyl-5-chlorophenylmercapto)-4-isobutoxybenzoic acid and 2-(2-methyl-5-chlorophenylmercapto)-4-n-butoxybenzoic acid, there is obtained 1-bromo-4-methyl-7-ethoxythiaxanthone, 1-iodo-4-methyl-7-n-propoxythianthone, 1-chloro-4-methyl-7-isobutoxythiaxanthone and 1-chloro-4-methyl-7-n-butoxythiaxanthone, respectively.

B. *1-(2-di-n-butylaminoethylamino)-4-methyl-7-methoxythiaxanthone hydrochloride*

This compound can be prepared following the procedure given hereinabove for Example 1B, but using 1-chloro-4-methyl-7-methoxythiaxanthone in place of 1-chloro-4,7-dimethylthiaxanthone. The product thus obtained is 1-(2-di-n-butylaminoethylamino) - 4 - methyl -7- methoxythiaxanthone hydrochloride.

Other 1 - (2-di-n-butylaminoethylamino)-4-methyl-7-alkoxythiaxanthones can be prepared according to the procedure given above, but using other 1-halo-4-methyl-7-alkoxythiaxanthones in place of 1-chloro-4-methyl-7-methoxythiaxanthone. Thus, using 1-bromo-4-methyl-7-ethoxythiaxanthone, 1-iodo-4-methyl-7-n-propoxythiaxanthone, 1-chloro-4-methyl-7-isobutoxythiaxanthone 1-chloro-4-methyl-7-n-butoxythiaxanthone, there is obtained 1-(2-di-n-butylaminoethylamino)-4-methyl-7-ethoxythiaxanthone hydrobromide, 1-(2-di-n-butylaminoethylamino)-4-methyl-7-n-propoxythiaxanthone hydroiodide, 1-(2-di-n-butylaminoethylamino)-4-methyl-7-isobutoxythiaxanthone hydrochloride and 1-(2-di-n-butylaminoethylamino)-4-methyl-7-n-butoxythiaxanthone hydrochloride, respectively.

EXAMPLE 4

A. *1-chloro-4-methylthiaxanthone*

The following preparation yields a mixture of the desired 1-chloro-4-methylthiaxanthone and its isomer, 1-methyl-4-chlorothiaxanthone, said mixture being satisfactory for use in the condensation reaction described below in Example 4B.

A mixture of 150 ml. of p-chlorotoluene and 1500 ml. of sulfuric acid was stirred vigorously at 25–30° C. as 60 g. of pure thiosalicylic acid was added. The mixture turned dark red, sulfur dioxide was evolved and the temperature rose about ten to fifteen degrees. Stirring was continued for about sixteen hours at room temperature then the mixture was held at 60° C. for two hours. The solution was poured into an ice-water mixture and filtered. The yellow solid was suspended in dilute ammonia and steam was passed into the suspension for thirty minutes to remove any unreacted p-chlorotoluene. Then the solid was collected on a filter and washed successively with water, alcohol and acetone. On drying there was obtained 83 g. (81%) of the thiaxanthone mixture suitable for use in the condensation with the diamine. It melted at 142–145° C. (uncor.). Upon crystallization from acetic acid the melting point was raised slightly to 145–147° C. The loss on crystallization was about 20%.

In another experiment 159 g. of crude dithiosalicylic acid was condensed with 750 ml. of p-chlorotoluene in the presence of 1250 ml. of sulfuric acid. The temperature rise upon the addition of the dithio acid was about five degrees. At the end of the reaction the mixture was poured into ice-water and the suspension steam-distilled to remove excess p-chlorotoluene. The solid was collected and treated as above. There was obtained 175 g. (65%) of the mixture of 1-chloro-4-methylthiaxanthone and 1-methyl-4-chlorothiaxanthone, M. P. 138–142° C.

B. *1-(2-di-n-butylaminoethylamino)-4-methylthiaxanthone hydrochloride*

A mixture of 20 g. of 1-chloro-4-methylthiaxanthone and its isomer, 1-methyl-4-chlorothiaxanthone, as prepared hereinabove under Example 4A, 25 g. of 2-di-n-butylaminoethylamine and 40 g. of pyridine was heated under reflux for eighteen hours. Then the mixture was allowed to cool and treated with a few ml. of 50% aqueous potassium hydroxide solution. The alkaline mixture was steam-distilled to remove the volatile bases. The residue was cooled and the supernatant liquid was carefully decanted. The residue was boiled with 500 ml. of 10% aqueous acetic acid and filtered. The insoluble residue was boiled again with two 100 ml. portions of 10% aqueous acetic acid, the solid being filtered after each extraction. The acid filtrates were combined and made alkaline. The precipitated product was collected in chloroform. After drying, the solution was concentrated in vacuo and the residue dissolved in dry ether. The ether solution was filtered and the filtrate was treated with a slight excess of ethanolic hydrogen chloride. The solid which deposited was filtered and dried. Wt. 11.0 g. This product, 1-(2-di-n-butylaminoethylamino)-4-methylthiaxanthone hydrochloride, melted at 166.4–167.4° C. (cor.) when crystallized from acetone and dried at 75° C. for at least twenty-four hours.

*Anal.*—Calcd. for $C_{24}H_{32}N_2OS \cdot HCl$: N, 6.47; S, 7.44. Found: N, 6.25; S, 7.52.

The above hydrochloride salt was sparingly soluble in cold water but readily soluble in hot water. The pure hydrochloride could be recrystallized from water. The corresponding ethanesulfonate was prepared from the hydrochloride as follows: A sample of the hydrocloride was dissolved in warm water and the solution was made alkaline with sodium carbonate solution. The liberated 1-(2-di-n-butylaminoethylamino)-4-methylthiaxanthone was taken up in chloroform. The chloroform was concentrated to dryness under reduced pressure and the residue dissolved in ether. To the ether solution was added a slight excess of ethanesulfonic acid (95%), whereupon there separated a gum which solidified on scratching. This salt, 1-(2-di-n-butylaminoethylamino) - 4 - methylthiaxanthone ethanesulfonate, was very soluble in cold water and melted at 142–144.4° C. (cor.) when recrystallized from acetone-ether.

*Anal.*—Calcd. for $C_{24}H_{32}N_2OS \cdot C_2H_5SO_3H$: N, 5.53; S, 12.66. Found: N, 5.60; S, 12.90.

EXAMPLE 5

A. *Di-n-butylaminoacetone*

A modification of the method of Breslow et al. [JACS 68, 100 (1946)] was used in this preparation. A solution of 181 g. of di-n-butylamine in 75 ml. of dry ether was added dropwise to a stirred solution of 63 g. of chloroacetone in 75 mm. of ether over a period of one hour. The mixture was then refluxed for an additional three hours. Sodium chloride was added to facilitate filtering the di-n-butylamine hydrochloride which had separated as a gum. After the mixture of sodium chloride and amine salt had been filtered off, the filter-cake was washed with ether and the combined filtrates distilled. The di-n-butylaminoacetone, which boiled at 111–112° C., weighed 77 g. (59%).

*Anal.*—Calcd. for $C_{11}H_{23}NO$: N, 7.57. Found: N, 7.48.

B. *1-di-n-butylamino-2-propylamine*

A solution of 75 g. of di-n-butylaminoacetone in 350 ml. of 15% methanolic ammonia was treated with Raney nickel catalyst and reduced at 640 p. s. i. at 75° C. in five hours. The catalyst was filtered off and the filtrate distilled first at atmospheric pressure and then under reduced pressure. The product, 1-di-n-butylamino-2-propylamine, which boiled at 59° C. at 0.9 mm., weighed 55 g. (73%).

*Anal.*—Calcd. for $C_{11}H_{26}N_2$: N, 15.03. Found: N, 14.81.

C. *1-1(di-n-butylamino-2-propylamino)-4-methylthiaxanthone hydrochloride*

This preparation was carried out according to the procedure described hereinabove in Example 2B, but using 20 g. of a mixture of 1-chloro-4-methylthiaxanthone and its 1-methyl-4-chloro isomer, 12 g. of 1-di-n-butylamino-2-propylamine and 10 g. of pyridine. The product, 1-(1-di - n - butylamino - 2 - propylamino) - 4 - methylthiaxanthone hydrochloride, melted at 192–193.5° C. (cor.), when recrystallized from acetone-ether.

*Anal.*—Calcd. for $C_{25}H_{34}N_2OS \cdot HCl$: N, 6.27; S, 7.17. Found: N, 5.97; S, 6.82.

Other 1-(1-di-n-butylamino-2-propylamino)-4-methylthiaxanthones can be prepared according to the above procedure using other 1-halo-4-methylthiaxanthones in place of the mixture of 1-chloro-4-methylthiaxanthone and its 1-methyl-4-chloro isomer. Thus, 1-(1-di-n-butylamino-2-propylamino) - 4 - methyl - 7 - chlorothiaxanthone hydrochloride, 1-(1-di-n-butylamino-2-propylamino) - 4,7 - dimethylthiaxanthone hydrochloride and 1-(1-di-n-butylamino-2-propylamino)-4-methyl-7-methoxythiaxanthone hydrochloride are formed using 1,7-dichloro-4-methylthiaxanthone, 1 - chloro - 4,7 - dimethylthiaxanthone and 1 - chloro - 4 - methyl - 7 - methoxythiaxanthone, respectively.

I claim:

1. 1 - (2 - di - n - butylaminoethylamino) - 4 - methylthiaxanthone having the formula

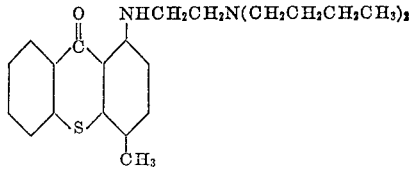

2. The process of preparing 1-(2-di-n-butylaminoethylamino)-4-methylthiaxanthone having the formula

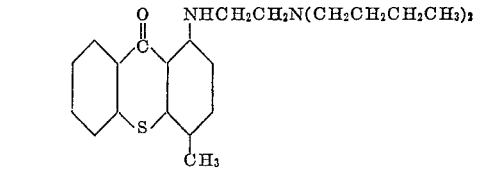

which comprises heating 1-chloro-4-methylthiaxanthone with 2-di-n-butylaminoethylamine.

SYDNEY ARCHER.

References Cited in the file of this patent

Mauss, Chem. Berichte 81, pp. 19–31 (1948).
Fiat Review of German Science, Chemotherapy, Office of Military Government for Germany, 1948, pp. 283–288.